(12) United States Patent
Gray et al.

(10) Patent No.: US 6,377,860 B1
(45) Date of Patent: Apr. 23, 2002

(54) NETWORKED VEHICLE IMPLEMENTING PLUG AND PLAY WITH JAVABEANS

(75) Inventors: Jamison Gray, Mountain View; Eric Chu, Los Altos, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/126,327

(22) Filed: Jul. 31, 1998

(51) Int. Cl.[7] ............................................. G05B 19/42
(52) U.S. Cl. ........................ 700/83; 700/86; 710/1; 701/36
(58) Field of Search ..................... 700/83, 86, 89, 700/99, 1–27; 710/1, 3, 4, 5, 18; 701/36, 33; 340/426

(56) References Cited

U.S. PATENT DOCUMENTS

| | | | | |
|---|---|---|---|---|
| 5,649,001 A | * | 7/1997 | Thomas et al. | 379/93.07 |
| 5,818,356 A | * | 10/1998 | Schuessler | 340/995 |
| 5,922,055 A | * | 7/1999 | Shahar et al. | 710/16 |
| 5,933,144 A | * | 8/1999 | Alcorn | 345/347 |
| 5,995,945 A | * | 11/1999 | Notani | 705/28 |
| 5,999,898 A | * | 12/1999 | Patel | 710/1 |
| 6,003,042 A | * | 12/1999 | Melahn | 707/203 |
| 6,009,363 A | * | 12/1999 | Beckert et al. | 701/33 |
| 6,011,460 A | * | 1/2000 | Flick | 340/426 |
| 6,025,655 A | * | 2/2000 | Hopf | 307/10.2 |
| 6,049,664 A | * | 4/2000 | Dale et al. | 395/701 |
| 6,052,632 A | * | 4/2000 | Iihoshi et al. | 701/36 |
| 6,061,721 A | * | 5/2000 | Ismael et al. | 709/223 |
| 6,065,057 A | * | 5/2000 | Rosen et al. | 709/229 |
| 6,104,971 A | * | 8/2000 | Fackler | 701/36 |
| 6,151,700 A | * | 11/2000 | Fox | 717/3 |
| 6,185,491 B1 | * | 2/2001 | Gray et al. | 701/36 |
| 6,189,050 B1 | * | 2/2001 | Sakarda | 710/18 |

OTHER PUBLICATIONS

"The Network Vehicle", Distributed Comdex 1997 (2 pages).
"Tech Watch", Time, Dec. 1, 1997.
"Car Multimedia", ST®, brochure date unknown.

* cited by examiner

Primary Examiner—Thomas Lee
Assistant Examiner—Rijue Mai
(74) Attorney, Agent, or Firm—McDermott, Will & Emery

(57) ABSTRACT

A vehicle control computer system uses JavaBeans™ to implement device interfaces. A vehicle control center, having a processor and memory, provides user access to devices operating within the vehicle. The manufacturer of such devices provides a JavaBean™ interface stored with the device. When a device is installed in the vehicle, the processor or other control element of the vehicle control center becomes aware of the installation and requests or otherwise receives the stored JavaBean™ interface from the device. A data structure is used to maintain information about interfaces for devices. The vehicle control center can then use the interface as received or replace it with a different interface already stored in memory by changing the contents of the data is structure.

27 Claims, 19 Drawing Sheets

| DEVICE TYPE | CONTROL BEAN REFERENCE | GUI BEAN REFERENCE | OVERRIDE |
|---|---|---|---|
| CD PLAYER | CD_MFG_CONTROL.BEAN | CD.MFG.GUI.BEAN | 0 |
| CD PLAYER | (EMPTY) | CADILLAC_GUI.BEAN | 1 |
| FM RADIO | FM_MFG_CONTROL.BEAN | FM_MFG_GUI.BEAN | 0 |
| ⋮ | ⋮ | ⋮ | ⋮ |

Figure 16

NETWORKED VEHICLE IMPLEMENTING PLUG AND PLAY WITH JAVABEANS

BACKGROUND OF THE INVENTION

1. Field of the Invention

The invention relates to computer control of user devices and, more particularly, to the use of JavaBeans™ for providing centralized control of attached devices in a vehicle network.

2. Description of Related Art

As computer controlled devices become more pervasive, it is not unexpected that such devices would spread to traditionally mechanical domains such as automotive vehicles. A network vehicle was demonstrated at the Comdex Trade Show in November of 1997. That vehicle had a central computer which was used to control several attached devices.

Various manufacturers have been developing and deploying bus architectures suitable for use in a vehicle.

Computer systems are known which permit "plug and play" operation. When a new device is attached to the computer bus, its presence is detected and it is automatically added to the list of devices known to the CPU to be on the bus.

Object oriented programming languages and object oriented development environments are known in the art.

JavaBeans™ and the Java Development Kit™ are well known products available from Sun Microsystems. JavaBeans™ is an architecture and platform neutral application programming interface for creating and using dynamic Java components. Application developers can use a variety of development tools, such as a Java Development Kit™ to assemble custom applications from fully portable JavaBeans™.

SUMMARY OF THE INVENTION

The invention is directed to methods, apparatus, systems and computer program apparatus using JavaBeans™ for implementing device interfaces in an vehicular computer system. In such a system, a vehicle control center, having a processor and memory, provides access to devices operating within the vehicle. The manufacturer of such devices provides a JavaBean™ interface stored with the device. When a device is installed in the vehicle, the processor or other control element of the vehicle control center becomes aware of the installation and requests or otherwise receives the stored JavaBean™ interface from the device. A data structure is used to store information about the interfaces. The vehicle control center can use the data structure to use one of the interfaces as received or replace it with a different interface already stored in memory. In this way, plug and play and hot plug and play functionality can be achieved.

The foregoing and other features, aspects and advantages of the present invention will become more apparent from the following detailed description of the present invention when taken in conjunction with the accompanying drawings.

BRIEF DESCRIPTION OF THE DRAWINGS

The present invention will be better understood from the following description in which:

FIG. 16 is an illustration of an expanded data structure preferred for use in carrying out the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those, requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
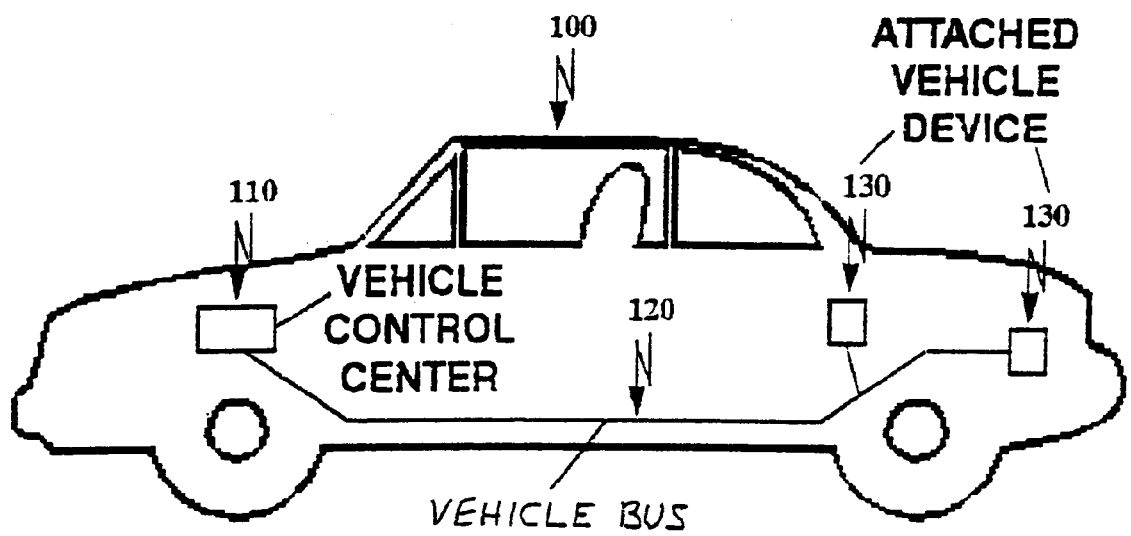
FIG. 1 is a view of an automobile showing an exemplary arrangement of components for a network vehicle in accordance with the invention.

FIG. 1 is a view of an automobile showing an exemplary arrangement of components of a network vehicle in accordance with the invention. The vehicle 100 contains a vehicle control center 110 which serves as a master to a bus 120. A plurality of attached vehicle devices 130 are also connected to the bus to be controlled by the vehicle control center.

Figure 2:
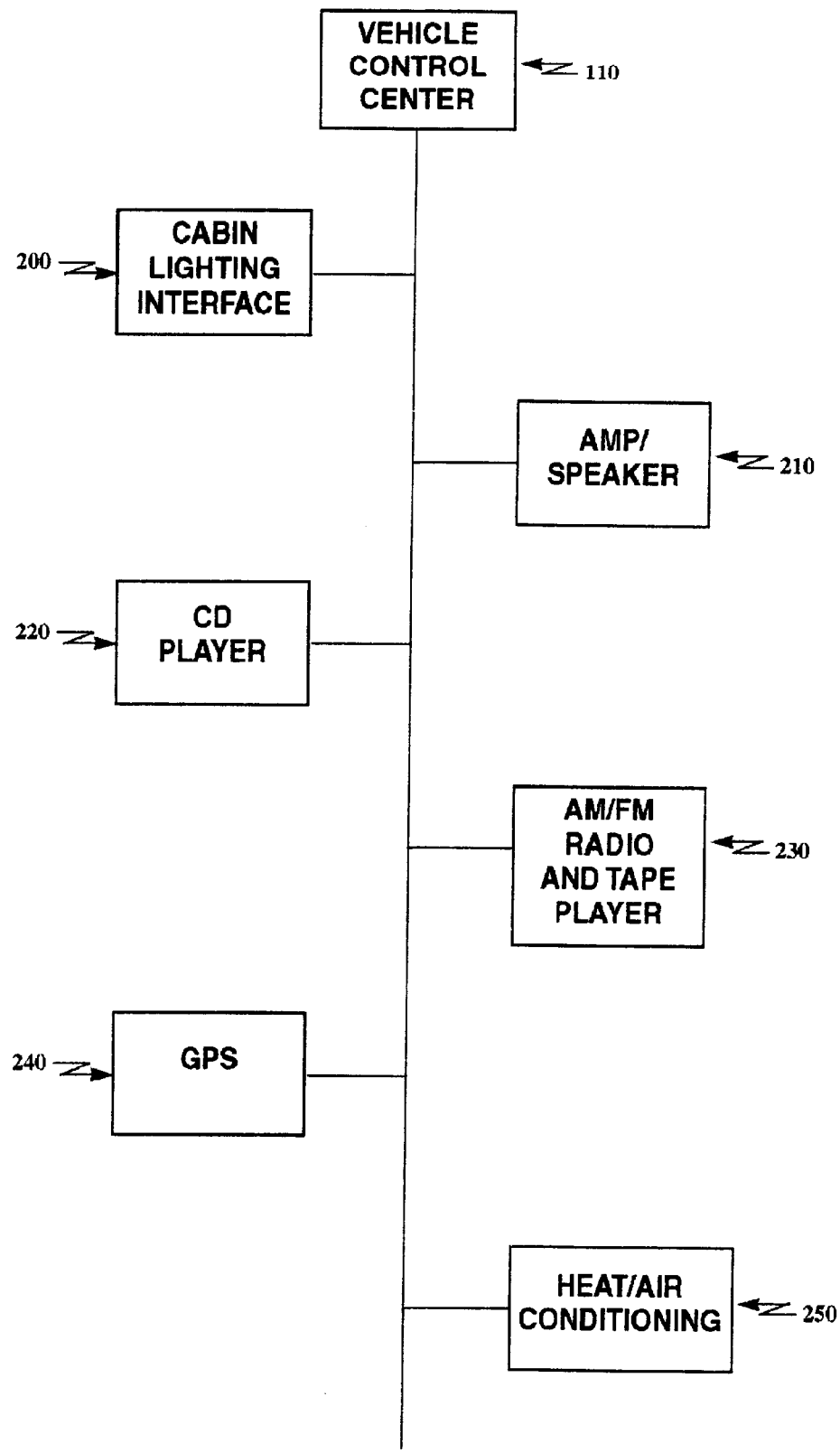
FIG. 2 is a block diagram of an exemplary vehicle network in accordance with the invention.

FIG. 2 is a block diagram of an exemplary vehicle network in accordance with the invention. The vehicle control center 110, as noted in conjunction with FIG. 1, controls bus 120. A plurality of devices 200, 210, 220, 230, 240 and 250 are illustrated as exemplary attached devices that might commonly be found in a network vehicle. Device 200 shows a cabin lighting interface by which the vehicle control center can be used to control the lights in the cabin of a vehicle. By way of entertainment, a CD player 220 is shown and an AM/FM radio and tape player 230. Each of these devices will use the services of amp/speaker unit 210. The amp/speaker component 210 will amplify and provide sound output from the CD player and from the AM/FM radio and tape player 230 to the passengers within the passenger cabin. A global positioning satellite system receiver 240 can be used to provide navigation information to the driver or other occupants of the vehicle. A heating/air conditioning unit 250 can be controlled using the vehicle control center to set the appropriate environmental conditions within the passenger cabin. Other attached devices can be used in the network vehicle. These include radar, air bag activation and status, video cameras, emergency rescue, alarms, anti-theft system, odometers, gyroscope, route guidance, access control, location transponder, video games, an internet connection, a digital multimedia broadcasting receiver, telephone receivers, digital video decoders and recorders, a digital audio broadcasting receiver, voice recognition systems, a cellular telephone handset either directly connected or linked via infrared, a digital cell phone module and a gateway to other buses. These are just exemplary of the many different kinds of attached devices which can be connected to the bus and controlled using the principles of this invention.

Figure 3:
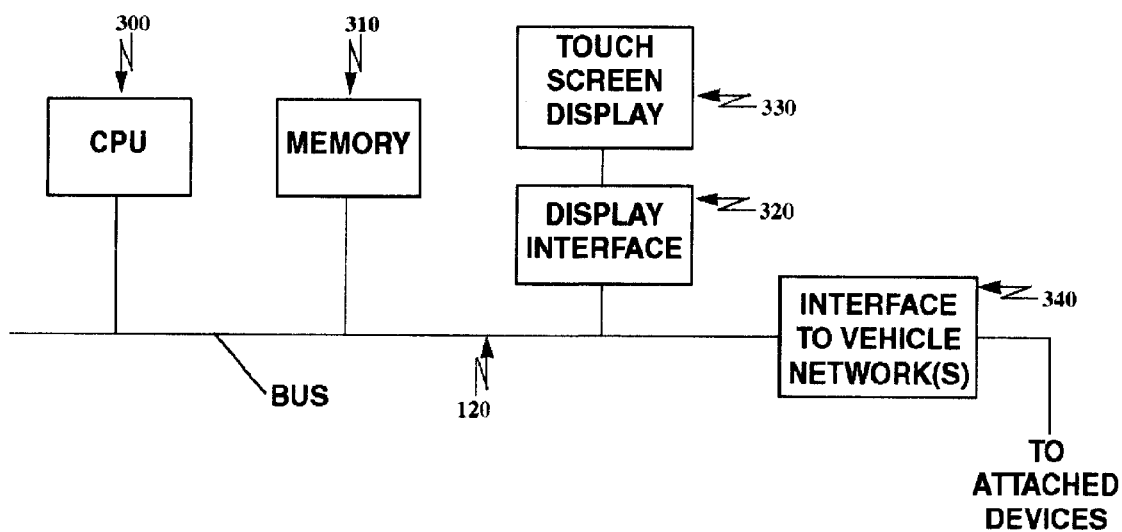
FIG. 3 is a block diagram of an exemplary vehicle control center shown in FIG. 2 in accordance with the invention.

FIG. 3 is a block diagram of an exemplary vehicle control center 110 shown in FIG. 2 in accordance with the invention. A CPU 300 and memory 310 are connected to bus 120. A touch screen display 330 is connected to the bus over a display interface 320. The computer bus 120 may be optionally connected to one or more vehicle networks through interface 340 to attached devices. Alternatively, the attached devices may be directly connected to the computer bus. Other configurations are possible, but this configuration provides the basic functionality for a vehicle control center.

Figure 4:
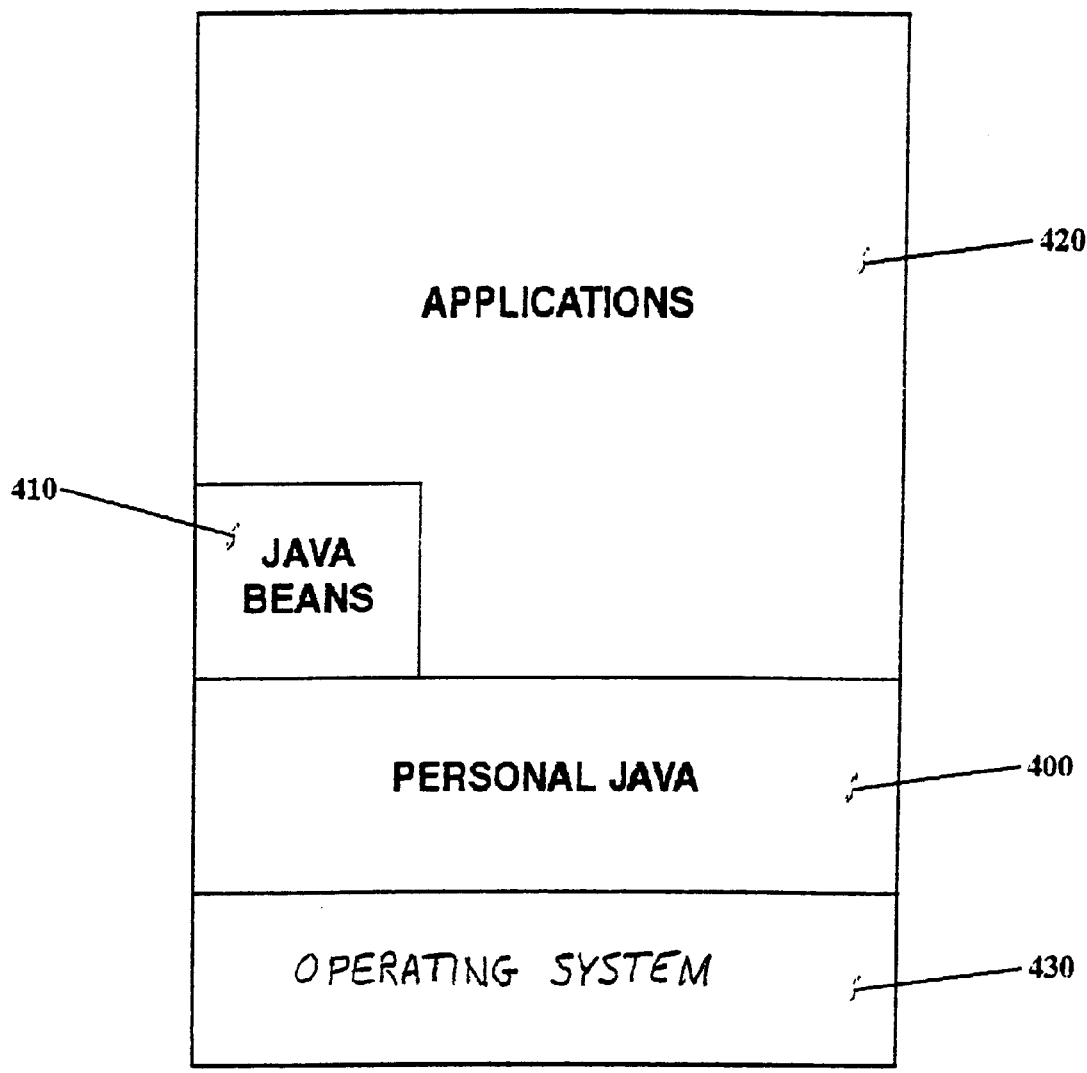
FIG. 4 is a diagram illustrating an exemplary software architecture for the vehicle control center shown in FIG. 3 in accordance with the invention.

FIG. 4 is a diagram illustrating an exemplary software architecture for the vehicle control center shown in FIG. 3 in accordance with the invention. Personal Java (400) runs on top of an operating system 430 and implements a virtual machine in the usual Java manner. The plurality of JavaBeans™ 410 are stored and may be selectively activated for carrying out the control functions in accordance with the invention. One or more applications may also be run on the virtual machine.

Figure 5:
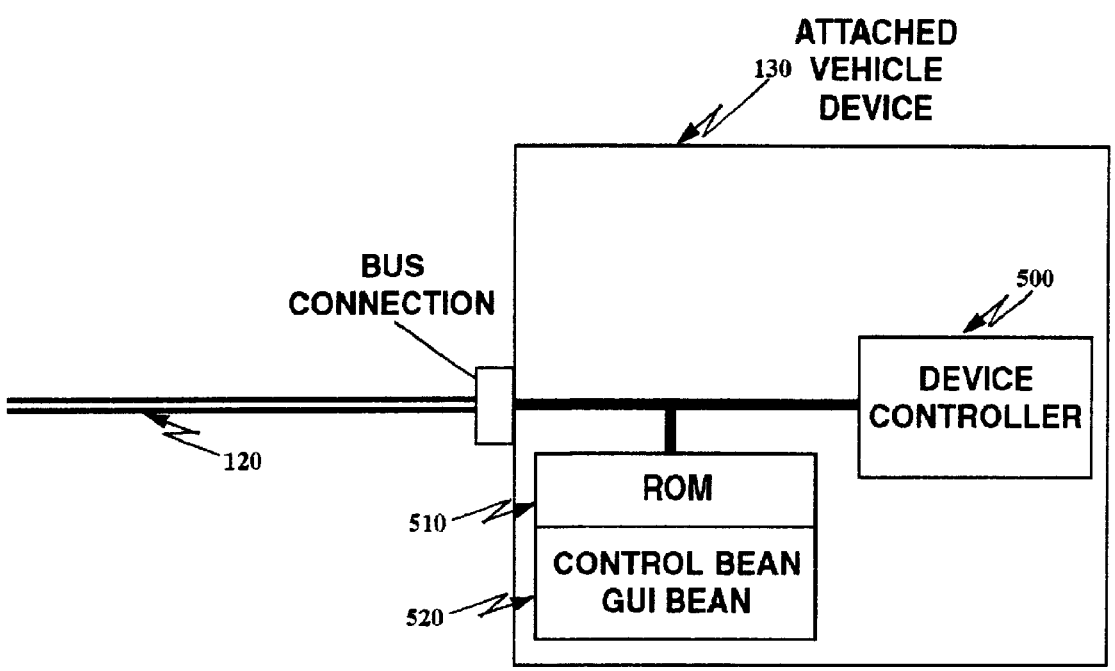
FIG. 5 is a block diagram of a first exemplary device attached to a vehicle network in accordance with the invention.

FIG. 5 is a block diagram of a first exemplary device attached to a vehicle network. Devices attached to the network bus 120, such as attached vehicle device 130 are typically run by a device controller 500. A device controller can be implemented as a finite state machine or as simple logic responding to the bus state. In the simplest implementation, illustrated here, a memory device such as ROM 510 stores information about the device and in addition, in one embodiment, contains a plurality of JavaBeans™ 520 for uploading to the vehicle control center over bus 120.

Figure 6A:
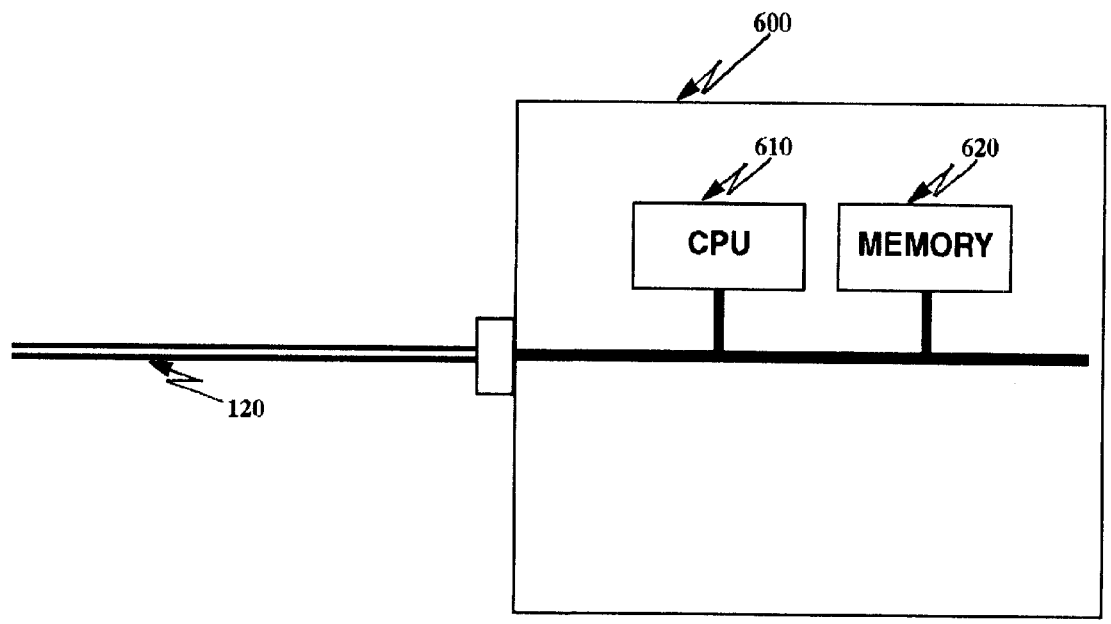
FIGS. 6A and 6B show an exemplary alternative device attached to a vehicle network and a corresponding software architecture for the alternative device, respectively, in accordance with the invention.
Figure 6B:
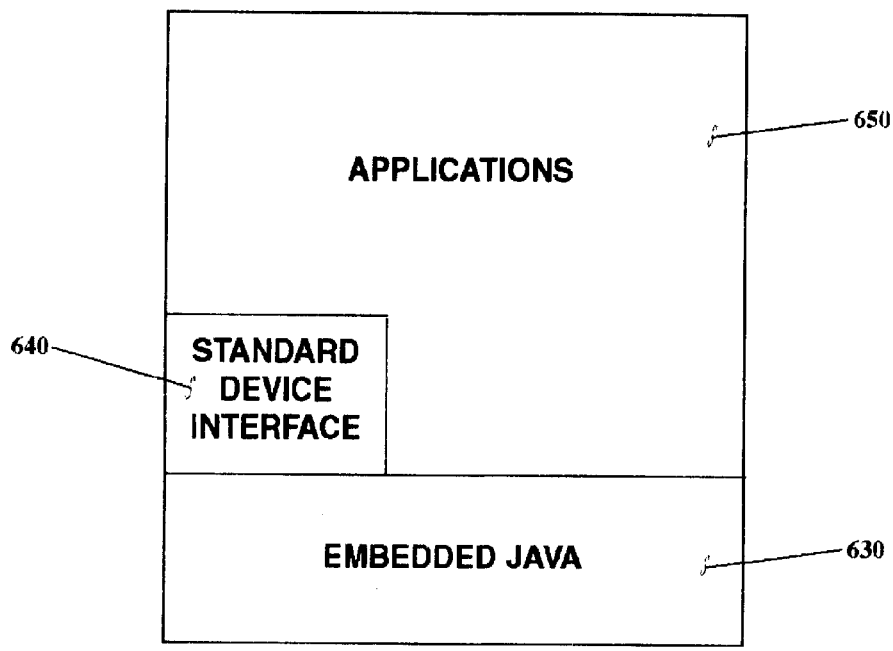

FIGS. 6A and 6B show an exemplary alternative device attached to a vehicle network and a corresponding software architecture for the alternative device, respectively, in accordance with the invention. A more sophisticated attached device 600 contains its own CPU or controller and memory 620 connected to the bus 120. In this particular implementation, embedded Java 630 can be run using CPU 610. A standard application programming interface (API) for automotive applications can be defined to standardize the programming interfaces to automotive devices. One or more Java™ objects conforming to the API, hereinafter called standard device interfaces 640 are stored as JavaBeans™ in the memory space of the attached device.

The embedded Java platform is an implementation of the Java platform that is customized for embedded devices, which typically have no display and limited user input/output capabilities. Personal Java is a more extensive subset of Java for devices which include a display and better user I/O. The FIG. 5 device does not need a version of Java at all in the attached device.

Figure 7:
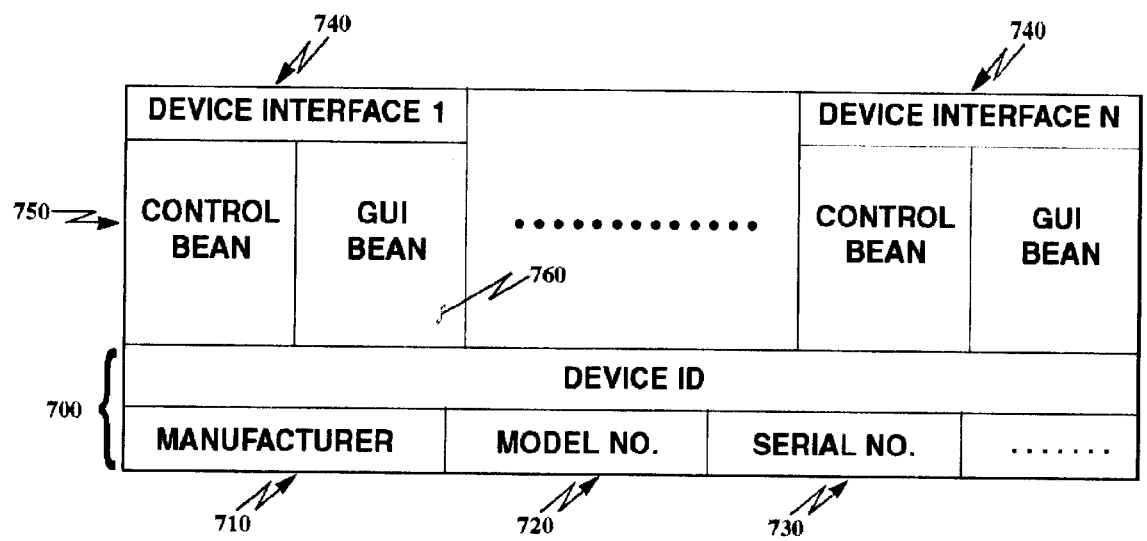
FIG. 7 illustrates a preferred way in which information can be stored in ROM (FIG. 5) and in memory (FIG. 7) in an attached device in accordance with the invention.

FIG. 7 illustrates a preferred way in which information can be stored in ROM (FIG. 5) or stored in memory (FIG. 6) in accordance with the invention. Typically, a device ID 700 will be stored. The device ID may contain information such as an identification of the manufacturer 710, a model number 720, a serial number of the device 730 and other information. In one embodiment, one or more standard device interfaces 740, such as standard device interface 1 or standard device interface N may be stored. In a preferred embodiment, each standard device interface includes a control bean for the execution of functionality to be performed in the vehicle control center to control the device with which the control bean is associated as well as a GUI bean which implements a graphical user interface by which the control functionality of the control bean may be exercised.

As an alternative to storing a control bean 750 and a GUI bean 760 or other beans associated with the standard device interface 740, the memory device or ROM may store a network address such as a uniform resource locator (URL) from which the appropriate manufacturer's interface may be downloaded. This permits the manufacturer to update a user interface on a dynamic basis and ensure that the most recent version of the manufacturer device interface is downloaded when a device is installed. This also reduces the ROM space required for storing the manufacturer's interface information and reduces the cost of the attached end device.

One should note that there are a number of ways in which the standard device interfaces or custom interfaces can be installed in the vehicle control center. They can be pre-installed in the vehicle control center when it is installed in the vehicle. Additionally, they can be requested and downloaded from the attached devices as described more hereinafter. They can be loaded from a diskette, CDROM, EPROM or other memory medium into the vehicle control center. They can be received over a network link from a URL address which address is either downloaded from the attached device or entered manually, and they can be input over an I/O link, such as an infrared port to the vehicle control center.

Figure 8:
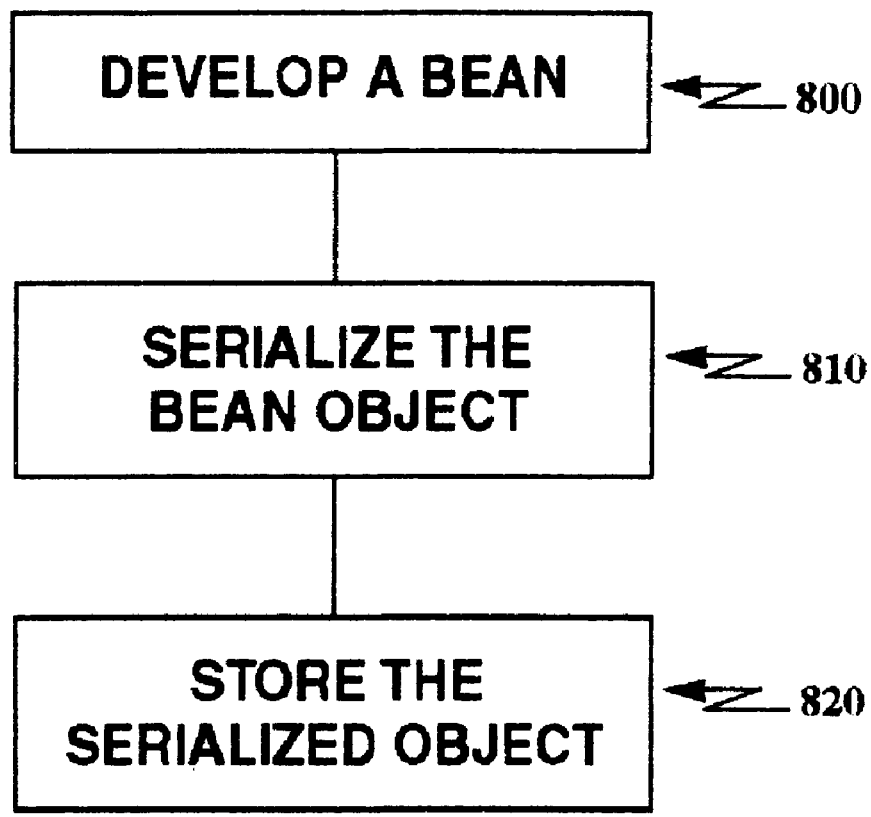
FIG. 8 illustrates a preferred process for developing and storing JavaBeans™ in accordance with the invention.

FIG. 8 illustrates a preferred process for developing and storing JavaBeans™ in accordance with the invention. A developer develops software to be implemented in a bean using, for example, the Java Development Kit™. The state of the bean and the code associated with the bean can be serialized and stored, using a standard call provided with the Java Development Kit™. It can of course be done equivalently using software developed by others for that purpose. The serialized bean is then stored (820) in memory for use as described in this specification.

Figure 9:
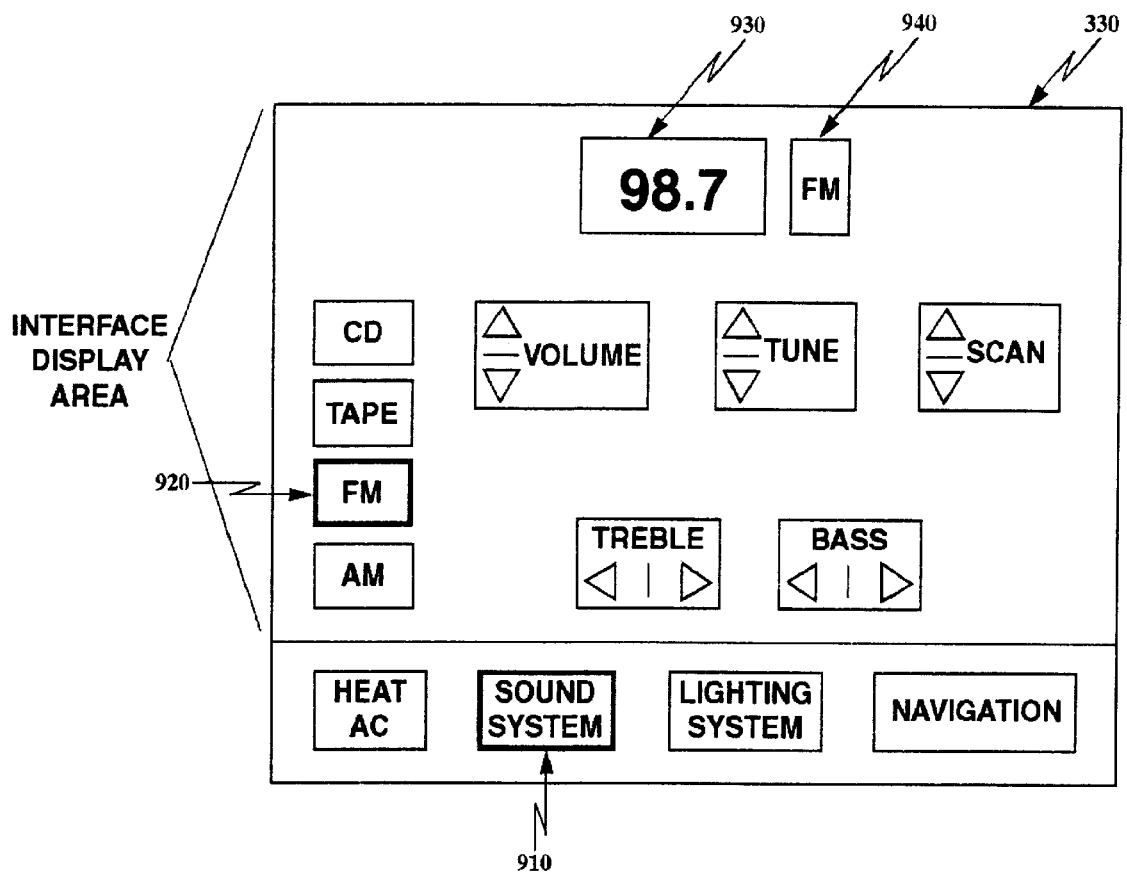
FIG. 9 is an illustration of an exemplary graphical user interface used in a network vehicle in accordance with the invention.

FIG. 9 is an illustration of an exemplary graphical user interface used in a network vehicle in accordance with the invention. In a preferred embodiment, the vehicle control center uses a touch screen display 330. The touch screen display is configured in a plurality of different ways to form a reconfigurable dashboard. In the exemplary GUI implementation shown in this Figure, a number of ray interfaces are selectable by touching buttons associated with the bottom row. Activation of one of the buttons on the bottom row will select the particular interface to be displayed in the space above the bottom row. In the Example shown in FIG. 9, the interface for the sound system has been activated by touching button 910. The fact that button 910 has been activated is indicated by the enhanced border around the button. When other buttons are selected, they will be similarly enhanced and the border around the sound system button 910 will revert part of the control bean associated with the graphical user interface bean used to implement the graphical interface display area.

Figure 10A:
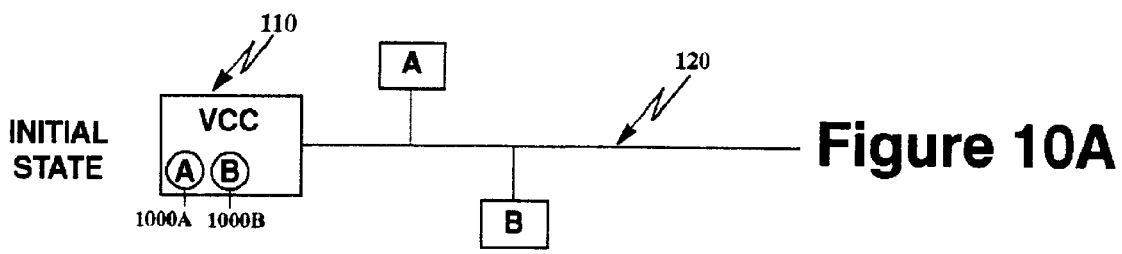
FIGS. 10A–10D illustrate stages by which a vehicle control center can obtain a standard device interface from an attached device in accordance with the invention.
Figure 10B:
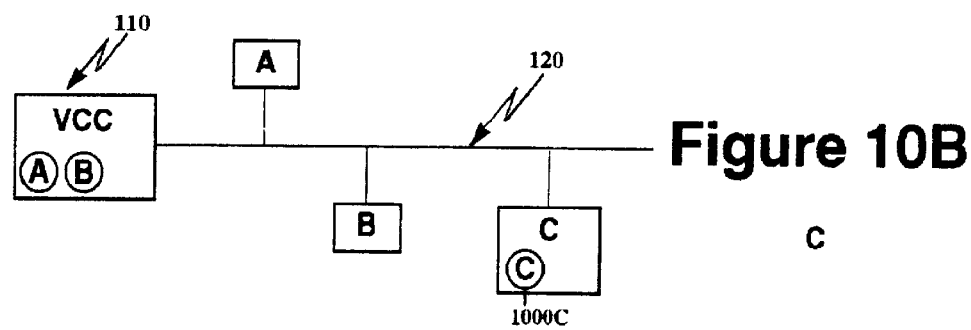
Figure 10C:
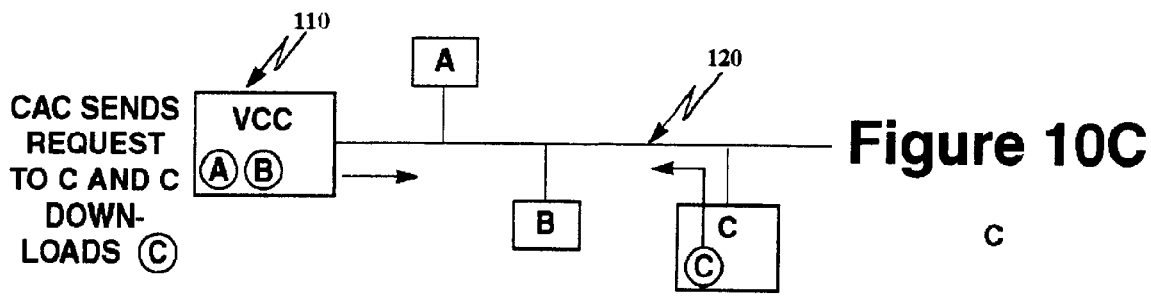
Figure 10D:
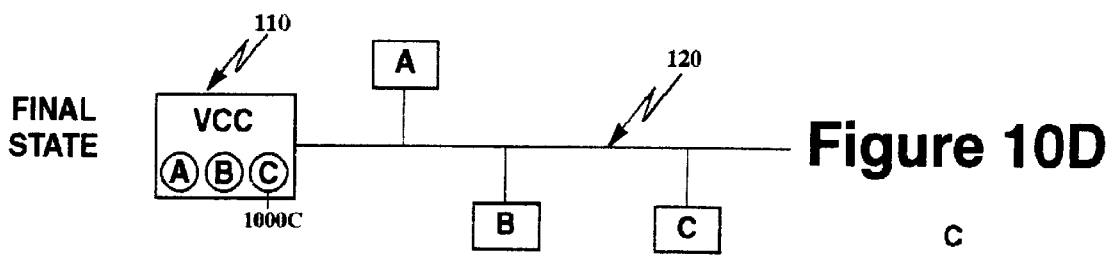

FIGS. 10A–10D illustrate stages by which a vehicle control center can obtain a standard device interface from an attached device in accordance with the invention. FIG. 10A illustrates the state in which two devices A and B have been attached to the bus 120. A Java bean 1000A represents an interface to device A and a Java bean 1000B represents an interface to device B. In FIG. 10B, a new device is shown added to the bus 120. It contains within it, as discussed previously, a standard device interface for the new device, such as one provided by a manufacturer. However, that standard device interface, 1000C, has not been loaded into the vehicle central control 110. As discussed herein, the vehicle central control sends a request over the bus 120 to newly connected device C requesting download of its standard device interface. In response to this request, the standard device interface 1000C is uploaded from the attached device to the vehicle control center 110 where it is stored. FIG. 10D shows the final state in which the control beans 1000C are stored in the vehicle control center for use in controlling device C over the bus.

Figure 11A:
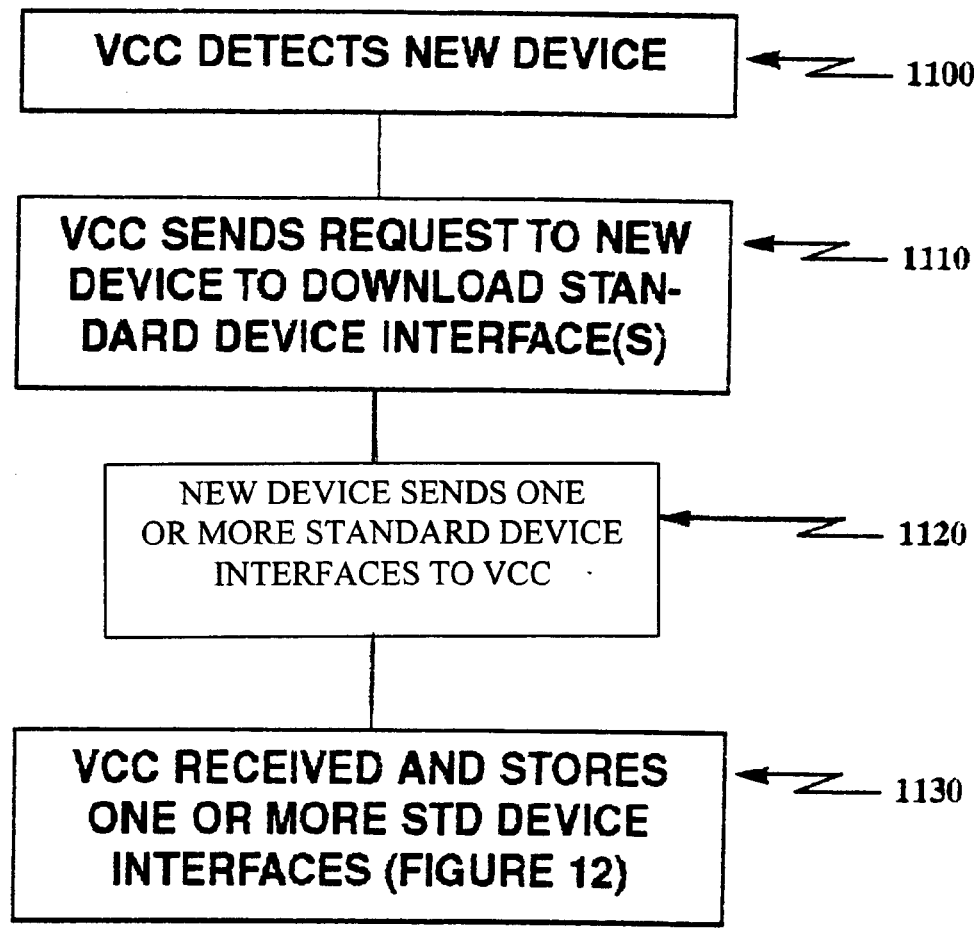
FIGS. 11A and 11B are flow charts of processes used to carry out the process described in conjunction with FIGS. 10A–10D in accordance with the invention.
Figure 11B:
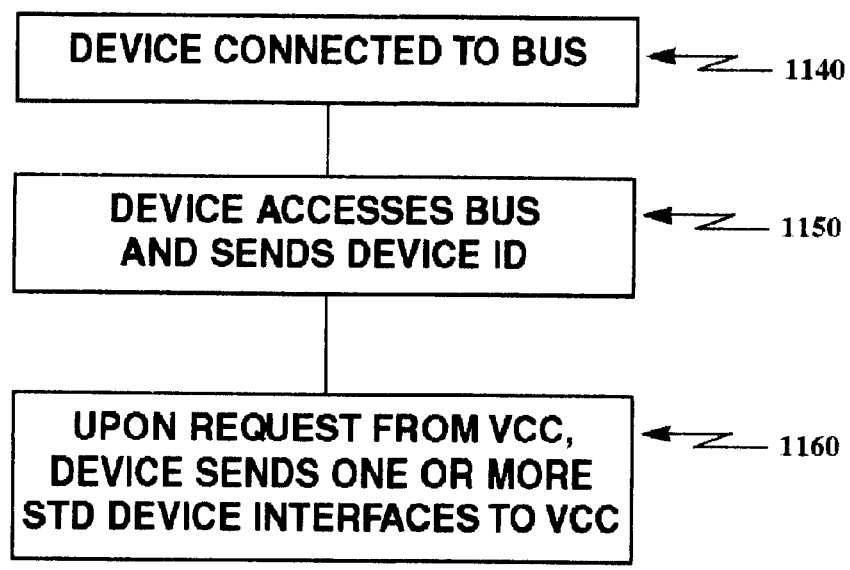

FIGS. 11A and 11B are flow charts of processes used to carry out the process described in conjunction to a normal outline. Each of the buttons shown on touch screen 330 can be implemented as an individual Java bean. JavaBeans™ can contain other JavaBeans™ in a hierarchical fashion. Accordingly, the entire graphical interface display area of touch screen 330 can be implemented using JavaBeans™ contained within one graphical user interface Java bean.

Along the left margin of the graphical interface display area are a plurality of buttons for selecting an appropriate sound function. In this case, the FM front end source has been selected as indicated by the enhanced boarder around button 920. Other selections include a CD player source, a tape player source and an AM radio front end. Volume control, adjustment of treble and bass, channel selection and scanning are also implemented. A display element 940 shows the particular source selected and window 930 shows the frequency of the station selected when in this mode. It is particularly instructive to note that many of the beans used to implement this graphical user interface may be reused in implementing the other interfaces for the CD, the tape, and the AM radio selections. Thus, the user of JavaBeans™ is provided with a powerful way to construct a graphical user interface. One should also note that each of the control functions, such as volume and tuning, invokes underlying functionality which would typically be with FIGS. 10A–10D in accordance with the invention. In FIG. 11A, the vehicle control center detects (1100) a new device. This can be done in any of the ways used in conjunction with normal plug and play detection. Typically this will occur upon boot-up. The vehicle control center then sends a request to the new device to download the standard device interface (110). The new device then sends one or more standard device interfaces to the vehicle control center (1120). The vehicle control center receives and stores (1130) the one or more standard device interfaces as discussed more in conjunction with FIG. 12. This particular form of the invention is preferred where hot adaptation of the bus configuration is not desired.

FIG. 11B shows a process which is preferred when hot reconfiguration of the bus is desired, that is, addition of devices to the bus without rebooting. This will be referred to as hot plug and play. When a device is connected to the bus during operation (1140), the device accesses the bus and sends its device ID (1150). The attached device then waits for a request from the vehicle control center and, if such a request is received, the vehicle device sends one or more standard device interfaces to the vehicle control center (1160).

It may be that the vehicle control center already contains a standard or custom interface for the particular device identified by the device ID. If that is the case, there will be no need to request the download of the interface from the attached device. If, however, the vehicle control center does not contain an interface for running the identified device, it can be requested and uploaded from the attached device to the vehicle control center.

Figure 12:
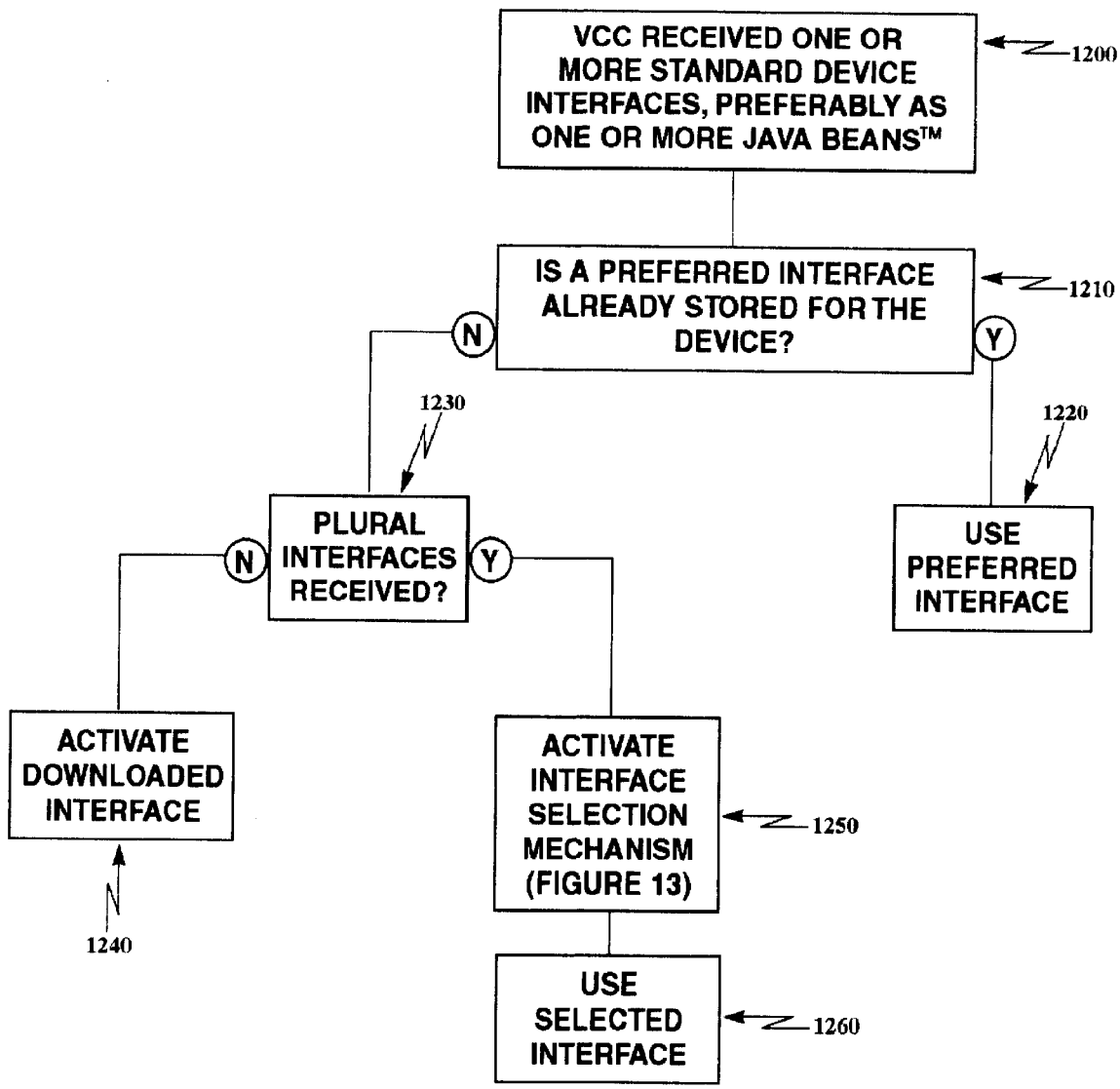
FIG. 12 is a flow chart of a preferred process for handling one or more standard device interfaces received over a network or bus in accordance with the invention.

FIG. 12 is a flow chart of a preferred process for handling one or more standard device interfaces received over the network or bus in accordance with the invention. When the vehicle control center receives one or more standard device interfaces (1200), preferably as one or more JavaBeans™, it checks to see if a preferred interface already has been stored for the device (1210). If there has been (1210-Y), the preferred interface will be used and the uploaded interface optionally discarded (1220). If there is no preferred interface already stored for the device (1210-N), the vehicle control center will determine whether plural interfaces have been received (1230). If only a single interface has been received (1230-N), that interface will be used to control the attached device (1240). If a plurality of interfaces are received (1230-Y), one will activate the interface selection mechanism shown in FIG. 13 (1250) and then use the selected interface (1260).

This process allows for customized interfaces for a particular device to be used in preference to a standard device interface. For example, although a particular CD player may come with a standard interface package, when it is integrated into a vehicle, for example, into a Cadillac™ by General Motors®, the vehicle manufacturer may have certain standards for look and feel which it desires to have consistent across all attached devices. In this case, the manufacturer of the vehicle would install GUI beans into the vehicle control center which would be used in preference to the GUI bean provided by the attached device manufacturer. These GUI beans may use the control beans provided by the device to access the device's capabilities. Further, the manufacturer may wish to preinstall a plurality of standard device interfaces which can be selectively applied by a user of a vehicle depending on the users preferences.

Figure 13:
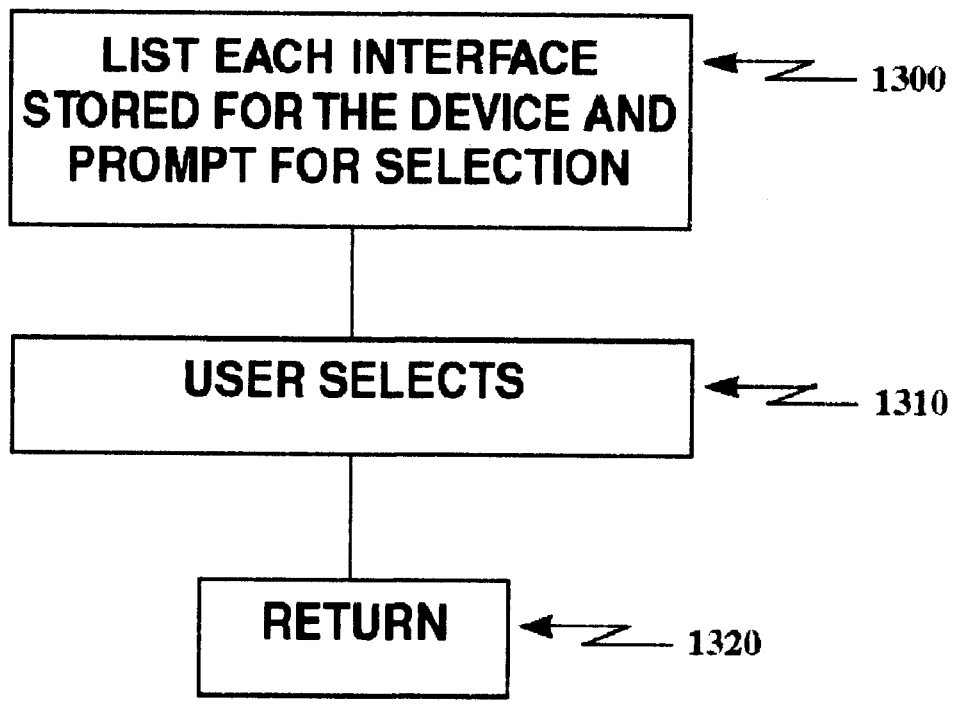
FIG. 13 is a flow chart of a process used to select an interface from a plurality of interfaces in accordance with the invention.

FIG. 13 is a flow chart of a process used to select an interface from a plurality of interfaces. In order to do this, a list of each interface stored in the device is presented (1300) and a prompt given to a user to select one of the listed interfaces. In a preferred embodiment, each of the stored interfaces is listed in an expanded data structure as discussed more hereinafter in conjunction with FIG. 16. The user then selects (1310) the desired device interface to use and the process returns (1320).

Figure 14:
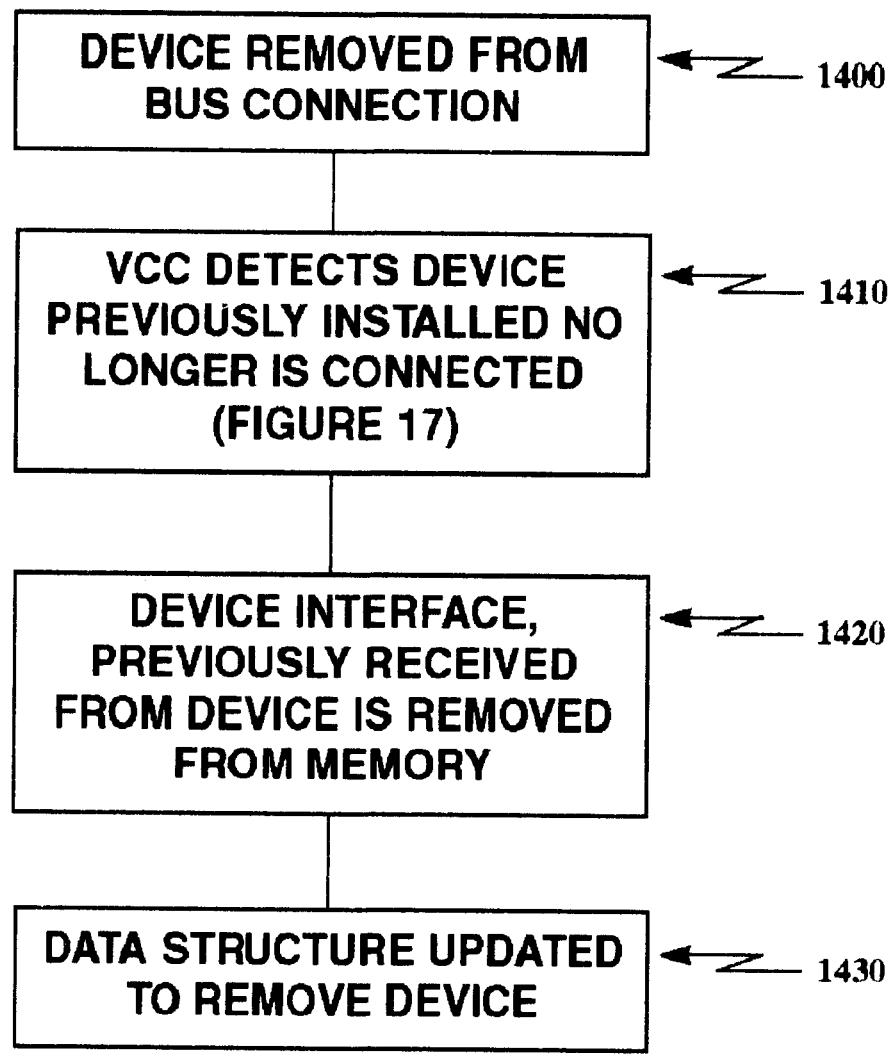
FIG. 14 is a flow chart of a process for removing a device from the network in accordance with one aspect of the invention.

FIG. 14 is a flow chart of a process for removing a device from the network. When a device is removed from its bus connection (1400), the vehicle control center detects that a device previously installed is no longer connected (1410). This can be done, preferably, using the process described in conjunction with FIG. 17 although there are several commonly known ways of detecting that a device has been removed. When a device is detected as having been removed, the device interface, previously received from the device is removed from memory (1420) and the data structure is updated to remove the device entries (1430).

Figure 15:
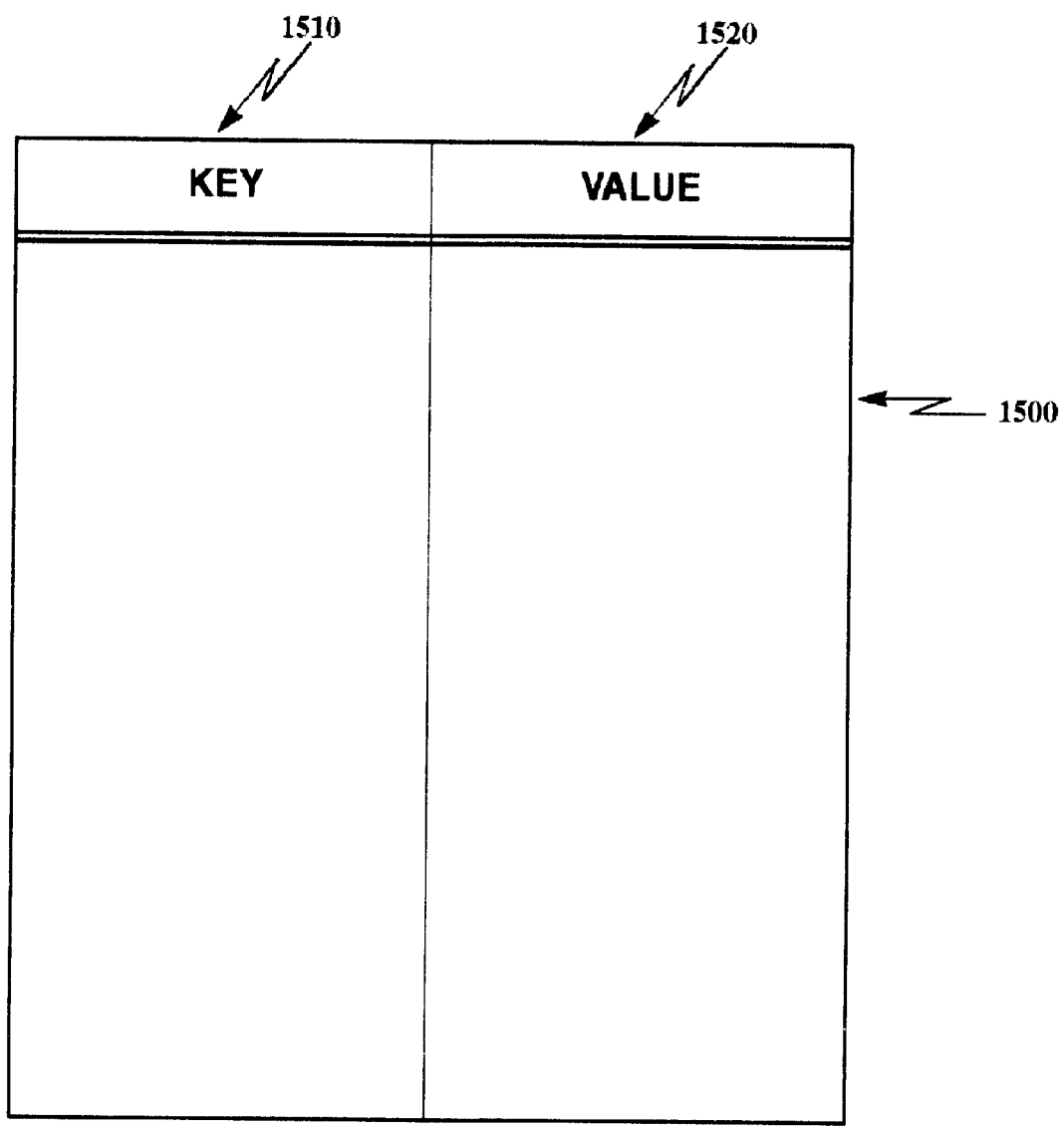
FIG. 15 is an illustration of a simple data structure used for storing information about objects in conjunction with JavaBeans™.

FIG. 15 is an illustration of a single data structure used in conjunction with JavaBeans™. In this example, the data structure 1500 is a simple text list of key-value pairs. It contains a field 1510 which describes an object name (a key) and a field 1520 containing a value associated with the object name. In this case, the value can be a reference or a handle to the object named in column 1510. As discussed herein, this data structure can be used to detect removal of objects from the bus or to add objects received over the bus from attached devices. The use of the data structure in accordance with the invention includes the use of the data structure for scanning to see whether a device is still attached to the bus as well as adding names to the data structure when standard device interfaces are uploaded from the attached devices and stored in the vehicle control center.

FIG. 16 is an illustration of an expanded data structure preferred for use in carrying out the invention. The expanded data structure goes beyond a simple list of key-value pairs.

In this implementation, there is a field 1610 in which a device type may be identified, a field 1620 in which a control bean reference may be included, a field 1630 in which a GUI bean reference may be listed and a field 1640 which indicates a preferred interface to be used when plural beans for control and/or GUI purposes are present. While this data structure is illustrated in table form, the same information can be stored in other ways, such as a hierarchical tree. An interface is a particular object type defined in a Java source file. It defines labels for a set of method calls, but the instantiation or code which executes the method calls is separate. The instantiation code is preferably in the form of a Java bean. Thus, associated with a particular device type (1610) may be one or more interfaces, such as those shown in 1620 and those interfaces may be instantiated by one or more JavaBeans™ listed in column 1630.

For example, a Java interface might have the following appearance:

```
interface CDPlayer {
    start ( );
    stop ( );
    play track (int n);
    play disk (int n)
}
```

The start function from the interface might be implemented as follows:

```
Class my_CDPlayer implements CDPlayer {
    start ( ) {
        send_start_command_over_bus ( );
    }
}
```

The visual component for implementing the CD player of this example might be implemented as follows:

```
Class my_CDPlayer implements CDPlayer,
Java.awt.Component {
}
```

One should note that the interface contains no execution code but does define the calls or commands used with the interface. An actual JavaBean™ object implements the interface. Thus, most of the API consists of interface definitions which are implemented by the actual code defined by the manufacturer of the attached device and provided as part of the control bean and GUI beans uploaded from the attached device.

Figure 17:
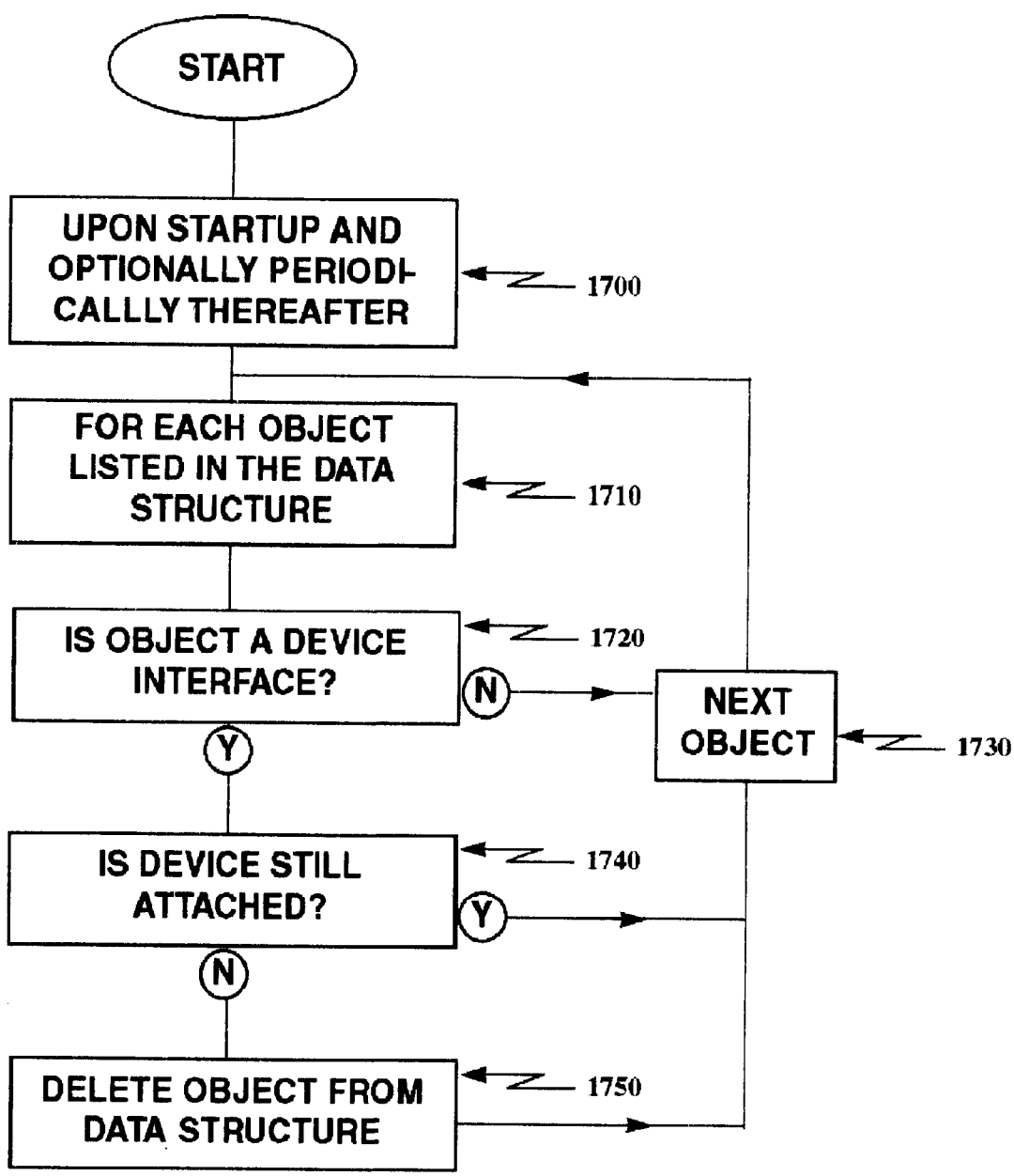
FIG. 17 is a flow chart of a process for automatically removing devices from the network in accordance with the invention.

FIG. 17 is a flow chart of a process for automatically removing devices from the network in accordance with the invention. Upon start-up, if normal plug and play is used and optionally (when hot plug and play is used) periodically thereafter (1700), for each object representing a device in the data structure (1710) a check will be made if the device is still attached (1740). If it is, the next object will be considered (1730). If it is not (1740-N), the object will be deleted from the data structure (1750).

Figure 18:
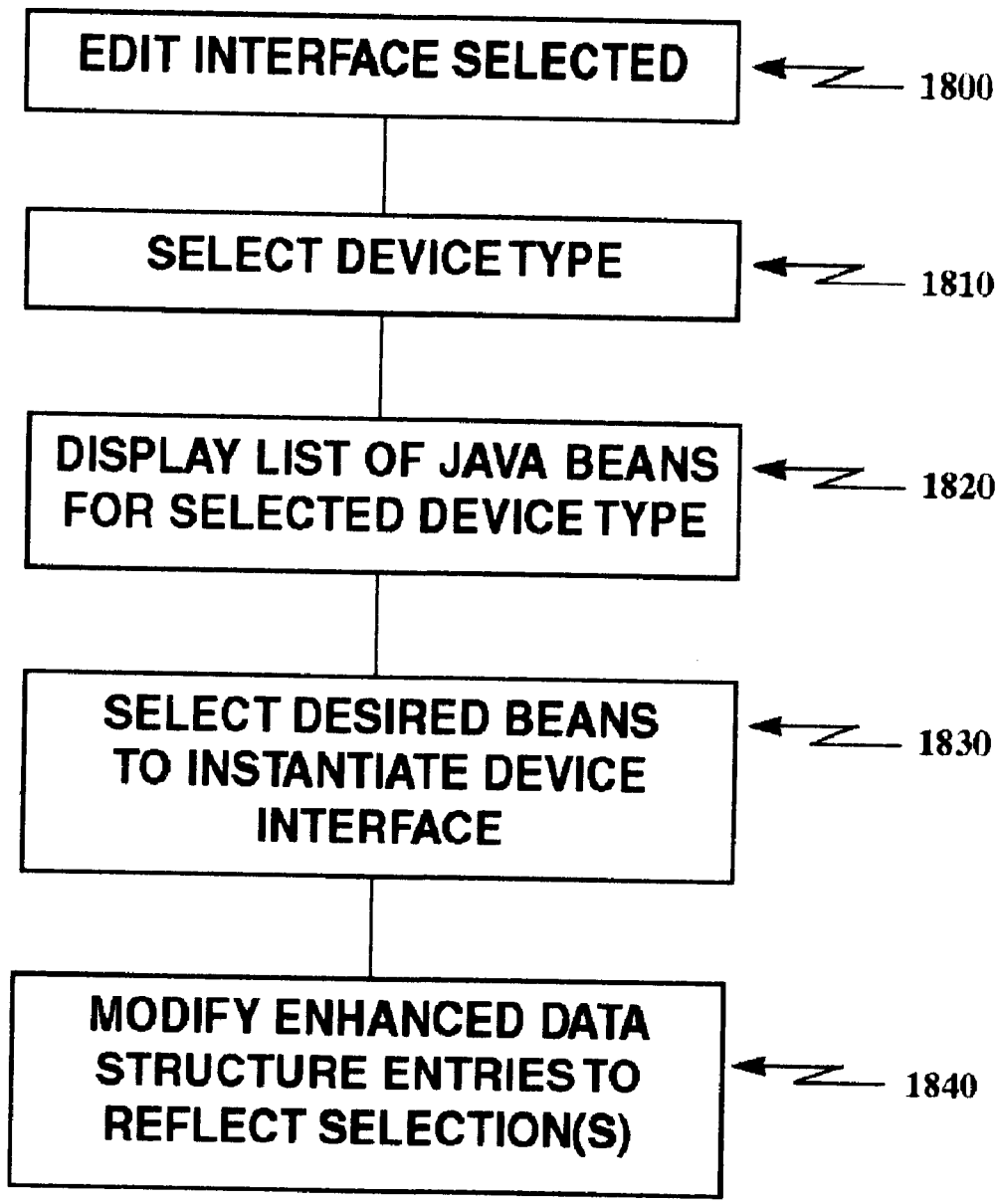
FIG. 18 is a flow chart of a process for changing interfaces or components of an interface.

FIG. 18 is a flow chart of a process for editing interfaces or components of an interface. When an interface function is selected (1800) a list of device types is presented from which a selection may be made. When the selection is made (1810), a list of JavaBeans™ associated with the selected device type are displayed (1820). These can be obtained from the enhanced data structure shown in FIG. 16. The particular beans desired to instantiate the device interface are then selected (1830) and the enhanced data structure is modified to reflect the user selections (1840).

Thus, there have been disclosed herein techniques for using JavaBeans™ to provide for plug and play and hot plug and play functionality and for allowing plug and play operation to occur even where the vehicle control center has no a priori knowledge of the type of device being attached to the bus.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. An automotive vehicle comprising:
   a. a communications medium;
   b. one or more devices connected to said communications medium, each device controllable over said medium;
   c. a vehicle control center, connected to said medium, said vehicle control center including a control element and memory, said memory including one or more Java-Beans™ for controlling at least one respective device, in which said control element is configured to detect connection of a device to said communications medium and obtain a JavaBean™ interface from said device.

2. The vehicle of claim 1, in which said control element periodically checks for new devices connected to said medium.

3. The vehicle of claim 2 in which said vehicle control center contains a data structure of connected devices and said control element adds a device to said data structure when a new device is detected.

4. The vehicle of claim 3 in which said data structure is an object data structure running on said control element.

5. The vehicle of claim 3 in which said data structure is a database of information about objects.

6. The vehicle of claim 5 in which said database includes information about the device type associated with an object.

7. The vehicle of claim 6 in which said object includes information about the type of object.

8. The vehicle of claim 5 in which said database includes information about whether the object is preferred over other objects of the same type.

9. The vehicle of claim 5 in which said database includes fields for information about control beans and GUI beans associated with a particular device type.

10. The vehicle of claim 1 in which a device newly connected to said communications medium contends for access to said medium and, when access is obtained, downloads one or more JavaBean™ interfaces to said control element.

11. The vehicle of claim 1 in which said vehicle control center contains a data structure of connected devices and said data structure is used to scan devices listed in said data structure to determine whether listed devices are still connected to said communications medium.

12. The vehicle of claim 11 in which said vehicle control center removes a JavaBean™ interface when a device listed in said data structure is no longer connected.

13. The vehicle of claim 11 in which said vehicle control center marks a JavaBean™ interface for overwriting when a device listed in said data structure is no longer connected.

14. The vehicle of claim 1 in which said vehicle control center includes a touch screen display and said JavaBean™ includes a graphical user interface (GUI) for interacting with said touch screen display.

15. The vehicle of claim 6 in which said GUI is a JavaBean™.

16. The vehicle of claim 2 in which said JavaBean™ includes a control bean for controlling said device.

17. The vehicle of claim 1 in which said control element is a processor running Personal Java™.

18. A method of installing a device to become part of an vehicle computer system, comprising the steps of:
    a. detecting that a device has been connected to said computer system;
    b. requesting a JavaBean™ interface from said device;
    c. storing said JavaBean™ interface; and
    d. entering information about said interface in a data structure.

19. The method of claim 18 in which said device automatically identifies itself to said vehicle computer system when it is connected to said computer system.

20. The method of claim 18 in which said computer system checks for devices newly added to said computer system.

21. The method of claim 18 in which said data structure is used to check whether devices are still connected to said computer system.

22. A method of installing a device to become part of a vehicle computer system, comprising the steps of:
    a. receiving an interface from said device,
    b. checking for other stored interfaces for said device, and
    c. selecting a desired interface to use with said device.

23. A method of uninstalling a device from a vehicle computer system, comprising the steps of:
    a. detecting that a device has been removed; and
    b. removing one or more interfaces associated with said device.

24. The method of claim 23, in which the step of detecting includes the step of checking each device listed in a data structure to determine if said device is still connected to said computer system.

25. A product for controlling an automotive computer system, comprising:
    a. a memory medium; and
    b. a series of instructions, stored on said memory medium, for causing said system to detect that a device has been connected to said computer system, for requesting a JavaBean™ interface from said device, for storing said JavaBean™ interface; and for entering information about said interface in a data structure.

26. A product for controlling an automotive computer system, comprising:
    a. a memory medium; and
    b. a series of instructions, stored on said memory medium, for receiving an interface from a device, checking for other stored interfaces for said device, and selecting a desired interface to use with said device.

27. A product for controlling an automotive computer system, comprising:
    a. a memory medium; and
    b. a series of instructions, stored on said memory medium, for detecting that a device has been removed from said system; and
    c. removing one or more interfaces associated with said device.

* * * * *